United States Patent [19]

Goodwater

[11] E Re. 29,580

[45] Reissued Mar. 14, 1978

[54] INTEGRATED FULLY SUPERVISED FIRE ALARM SYSTEM

[75] Inventor: Harry C. Goodwater, San Francisco, Calif.

[73] Assignee: Audio Alert Corporation, San Francisco, Calif.

[21] Appl. No.: 348,089

[22] Filed: Apr. 5, 1973

Related U.S. Patent Documents

Reissue of:

[64] Patent No.: 3,656,158
Issued: Apr. 11, 1972
Appl. No.: 93,768
Filed: Nov. 30, 1970

[51] Int. Cl.[2] ..... G08B 21/00

[52] U.S. Cl. ..... 340/409; 179/1 MN; 179/2.5 R; 324/51; 340/227 R; 340/253 B; 340/253 Q

[58] Field of Search ..... 179/2.5 R, 1 MN; 324/51; 340/409, 253 B, 253 Q, 384 E

[56] References Cited

U.S. PATENT DOCUMENTS

| | | | |
|---|---|---|---|
| 1,966,538 | 7/1934 | Bryan et al. | 340/253 B |
| 2,085,773 | 7/1937 | Squire | 340/409 X |
| 2,280,421 | 4/1942 | Chappell et al. | 340/253 B X |
| 2,463,339 | 3/1949 | Wetzel et al. | 340/409 X |
| 2,525,697 | 10/1950 | Lurie | 179/5 R |
| 2,556,363 | 6/1951 | Lord et al. | 340/253 B |
| 2,632,155 | 3/1953 | Lamb | 340/220 |
| 2,703,877 | 3/1955 | Stoff et al. | 340/409 X |
| 2,782,405 | 2/1957 | Weisz et al. | 240/253 Q X |
| 2,800,645 | 7/1957 | Koch | 340/409 |
| 2,910,688 | 10/1959 | Kelley et al. | 340/384 E |
| 2,942,245 | 6/1960 | Wooten | 340/220 X |
| 3,041,588 | 6/1962 | Malin | 340/384 E |
| 3,161,731 | 12/1964 | Seeley | 340/409 X |
| 3,192,506 | 6/1965 | Collins | 340/409 X |
| 3,404,393 | 10/1968 | Blivice et al. | 340/409 X |
| 3,489,865 | 1/1970 | Waitz et al. | 324/51 X |

FOREIGN PATENT DOCUMENTS

| | | | |
|---|---|---|---|
| 20,407 | 6/1966 | Japan | 179/1 MN |

*Primary Examiner*—David L. Trafton
*Attorney, Agent, or Firm*—Warren M. Becker

[57] ABSTRACT

A low voltage audio fire alarm system fully integrated in a paging and music speaker system. The alarm circuits including pull-boxes and automatic fire, smoke and heat detection apparatus and the audio circuits are fully and continuously supervised against component failure by means of a plurality of current responsive relays. The audio path including the speaker system and associated amplifiers is continuously monitored by a low level supersonic 26KC signal. Fail-safe features utilizing multi-contact switches and relays are incorporated throughout the system to prevent inadvertent silencing of alarms in the absence of an alarm condition.

15 Claims, 2 Drawing Figures

INVENTOR.
HARRY C. GOODWATER
BY Warren M Becker
J Rosenblum
ATTORNEYS

INTEGRATED FULLY SUPERVISED FIRE ALARM SYSTEM

Matter enclosed in heavy brackets [ ] appears in the original patent but forms no part of this reissue specification; matter printed in italics indicates the additions made by reissue.

BACKGROUND OF THE INVENTION

Conventional fire alarm systems providing audible alarms by means of bells, buzzers, and sirens are generally separate and distinct systems apart from any music or paging system which otherwise may also be provided in the building or area desired to be protected. Systems which conventionally utilize existing music or paging systems deliver the alarm by substituting through switches and relays an alarm signal for the normal audio input of such systems. Typically there is no provision in such systems for continuously monitoring the integrity of the audio system or the fire alarm system.

SUMMARY OF THE INVENTION

In accordance with the present invention there is provided an entirely supervised, low voltage fire alarm system which is fully integrated in a clock, music and paging system. Both the audio circuits including speakers, transformers and associated amplifiers and the alarm circuits including pull-box and automatic fire, smoke and heat detection apparatus are continuously monitored for continuity and component failure by means of multi-contact current responsive relays. A low level supersonic 26 KC supervisory oscillator is used in monitoring the audio circuits. Fail-safe features are built into the system by means of multi-contact switches and relays to prevent inadvertent silencing of the alarm signals in the absence of an alarm condition. In a typical alarm circuit using pull-boxes in parallel and placed strategically about the building or area to be protected, the line is terminated by a relatively low resistance as of 500 ohms. In series with the pull-boxes there is provided a pair of current responsive relays one of which is adjusted to energize only in the event a pull-box is activated and shorts out the line termination resistor. This latter relay is called the alarm relay. The former relay, called a loop supervisory relay, is held in a normally energized condition by a dc voltage supply until such time as an open condition exists in the alarm circuit.

In like fashion, normally energized relays are used to monitor an ac input line voltage, the output of a dc voltage supply, the operation of a tone generator used in generating an audible alarm, and the low level supersonic 26 KC supervisory oscillator used to supervise the audio circuits and applies on alarm signal from the tone generator to the audio circuits. The alarm signal may be steady, pulsed or warble. Coded pull-boxes also may be used if desired. Any malfunction of the fire alarm system resulting in a change in the normal condition of a relay activates an associated indicating light identifying the malfunction. Trouble bells and remote indicating lights are also used.

Because the alarm signals are generated and transmitted over closed audio paths, the absence of switch created arcs makes the fire alarm system of the present invention particularly useful in explosive or flammable atmospheres. The integrated nature of the system of the present invention with its self-monitoring features greatly reduces the cost of fabrication and installation with an increase in reliability for such systems especially desirable in schools and hospitals which typically use music and paging systems.

DESCRIPTION OF THE DRAWING

These and other objects, advantages and features of the present invention will be apparent from the following detailed description and accompanying drawing in which.

DETAILED DESCRIPTION

Figures 1, 2:
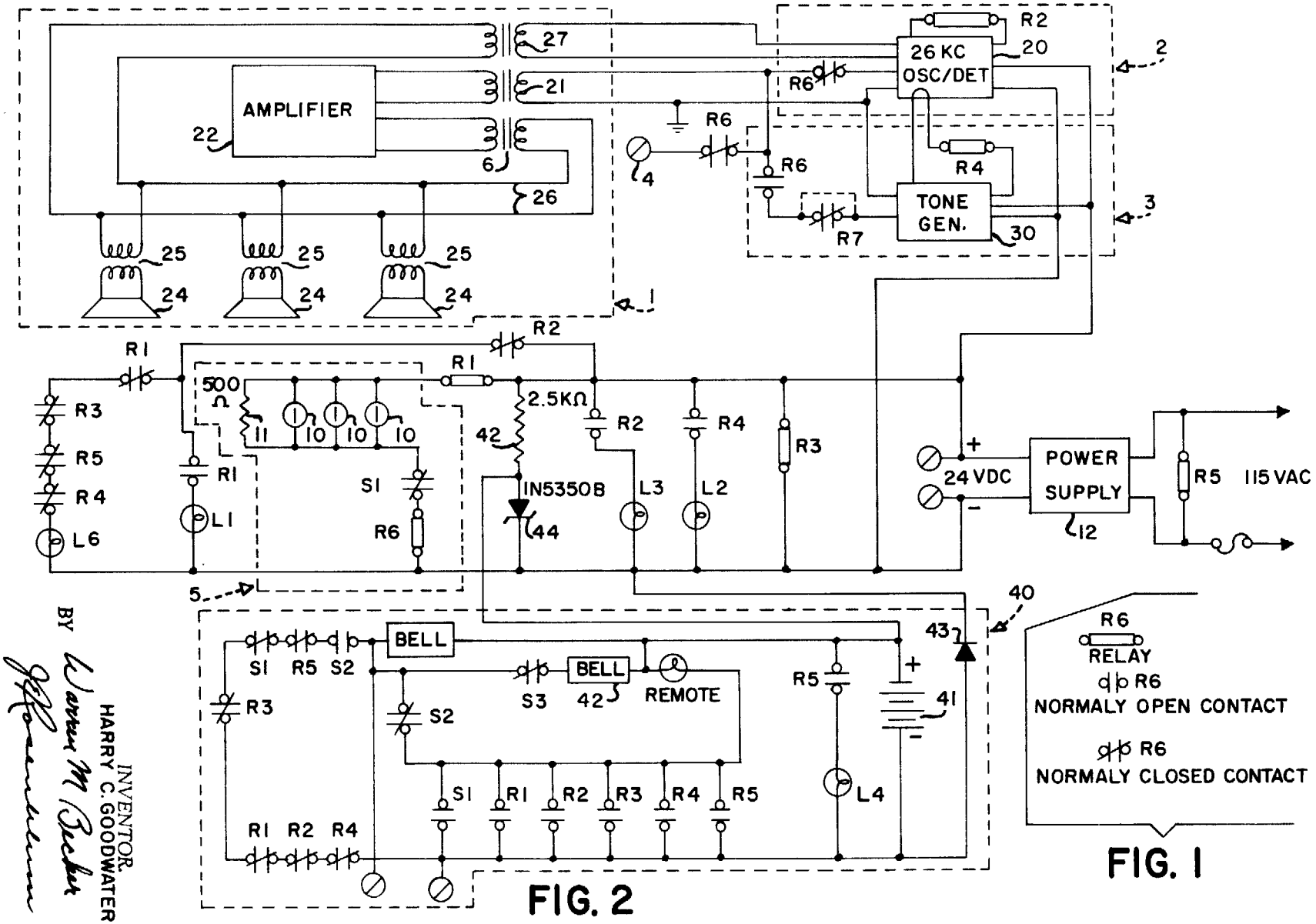
FIG. 1 illustrates the convention used in describing the relays and switches controlled by the relays.
FIG. 2 is a schematic of the present invention.

The fire alarm system of the present invention comprises a plurality of relays and relay controlled switches which serve to indicate alarm conditions, internal system malfunctions, and improper or abnormal setting of system circuits. For clarity of illustration and to facilitate a better understanding of the interrelationship and operation of the relays and switches as they are used in the present invention, applicant has adopted the convention as shown in FIG. 1 for illustrating each of the relays and the normally closed and normally open switches associated with and controlled by each of said relays. It is understood that the identical alpha-numeric designation is retained and used to identify each relay and the switches controlled thereby. Thus it is recognized that the state of each of the switches is as illustrated for a system in a non-alarm condition and functioning normally.

Referring to FIG. 2 there is provided a conventional balanced line audio circuit 1 for producing audible signals in response to audio signals applied to its input. A supervisory signal generating circuit 2 is provided and adapted to be selectively coupled to audio circuit 1 through a normally closed relay controlled switch R6 at all times in the absence of an alarm condition. An alarm signal generating circuit 3 is provided and adapted to be selectively coupled to audio circuit 1 through a normally open relay controlled switch R6 in response to an alarm condition. An input 4 to audio circuit 1 is further provided for passing through a second normally closed relay controlled switch R6 to audio circuit 1 appropriately matched audio signals from sources (not shown) as is found in conventional clock, paging and music systems. As previously indicated normally closed switches R6 and normally open switch R6 are controlled by a single relay of the same designation, R6, as is described with respect to FIG. 1.

The control of switches R6 is provided by an alarm loop or alarm indicating circuit 5 of which relay R6 is a component part. As will be apparent, relay R6 is normally maintained in a de-energized state. In alarm loop 5 there is provided a plurality of remote station indicators 10 coupled in parallel with a low impedance circuit element 11, such as 500 ohm resistor. Relay R6 is coupled in series with indicators 10 and resistor 11 through a manually operable normally closed switch S1 commonly called an alarm reset switch. Remote station indicators 10 may be of any of several available manually operable or automatic detection devices typically used to indicate the presence of fire, smoke or other alarm conditions at predetermined locations about an area or building to be protected.

Power is supplied the fire alarm system of the present invention by a low voltage dc power supply 12, as of 24 volts. A normally energized alarm loop supervisory relay R1 is coupled in series with supply 12, indicators 10, resistor 11, switch S1 and normally de-energized alarm relay R6 and serves to monitor the continuity and operational status of alarm loop 5. Power supply 12 is itself powered by conventional ac power, as of 115 volts. A normally energized power failure relay R5 is provided across the input of supply 12 to indicate a loss or insufficiency of ac power. A normally energized dc power supply failure relay R3 is provided across the output of supply 12 and serves to indicate a loss or insufficiency of power.

Referring to supervisory signal generating circuit 2 there is provided an oscillator 20 for generating a low level supersonic signal, as of 26 KC. Oscillator 20 is powered by dc supply 12. The output of oscillator 20 is passed through switch R6 as previously indicated and inductively coupled to audio circuit 1 through a transformer 21. Audio circuit 1 comprises an amplifier 22 which is inductively coupled by means of a transformer 23 to a plurality of speakers 24 inductively coupled in parallel by transformers 26 to a balanced audio transmission line 26. The output end of transmission line 26 is inductively coupled through an isolation transformer 27 back to supervisory signal generating circuit 2 to power a normally energized supervisory relay R2. Relay R2 serves to indicate any loss of the supersonic signal due to component failure or loss of continuity in audio circuit 1. The frequency of approximately 26 KC is preferred for oscillator 20 as it is slightly above the audible range, produces a minimum of rf radiation interference problems with other receiving equipment and is generally within the bandpass of conventional audio amplifiers and components available for use in audio circuit 1. The power output level of oscillator 20 is preferably maintained at a low lever, as of 3 millivots to prevent overworking amplifier 5 and to reduce undesirable psychological effects which have been observed by persons listening to superimposed audible sounds and supersonic signals.

At the initiation of an alarm condition, oscillator 20 and any external source of audio signals are disconnected from audio circuit 1 by normally closed switches R6. Simultaneously, normally open switch R6 inductively couples audio alarm signal generating circuit 3 to audio circuit 1 through transformer 21. Audio alarm signal generating circuit 3 is provided with a tone generator 30. Tone generator 30 is adapted to continuously output an audio signal which is amplified by amplifier 22 and broadcasted over speakers 24 to provide a warning of the existence of a hazardous condition in the area protected. Tone generator 30 may be one of several types of conventional devices which output steady, pulsed or warble audio signals. Audio alarm signal generating circuit 3 is further provided with a tone generator failure relay R4 which is normally energized by the audio signal continuously generated by tone generator 30 even during non-alarm conditions, that is, when tone generator 30 is not coupled to audio circuit 1. To insure that the printed circuit board (not shown) comprising oscillator 20 is properly seated or aligned in its electrical connector (not shown) one lead of relay R4 is routed through the connector. Thus, if either tone generator 30 fails to perform properly or oscillator 20 is misaligned in its electrical connector, relay R4 will provide an indication isolating the problem.

To provide a visual and an audible indication of a malfunction in the circuits described there is provided a bell and a number of lights which are controlled by the relays described. A light L2 is provided in series with a normally open switch R4 across supply 12. If relay R4 is de-energized due to either a failure of tone generator 30 or misalignment of the printed circuit board of oscillator 20, L2 will be illuminated. A light L3 is provided in series with a normally open switch R2 across supply 12 to indicate visually a failure in audio circuit 1.

Monitoring of the operational status of alarm loop 5 is provided by alarm loop relay R1 coupled in series with supply 12 and alarm relay R6. The magnitude of previously described resistor 11 is chosen to maintain relay R1 normally energized. Alarm relay R6, however, is adjusted to remain normally de-energized until one or more of station indicators 10 is activated to short out resistor 11 or otherwise reduce the effective impedance of alarm loop 5.

Alarm relay R6 is further provided with a conventional holding circuit (not shown) which holds alarm relay R6 in an energized state after it is once energized to maintain the production of audible warning signals over speakers 24 in the event that the continuity of alarm loop 5 is thereafter broken as might occur in a case of fire. Normally closed switch S1 in series with alarm relay R6 serves to break the holding current on relay R6 and thereby silence the audible warning signals.

To provide a visual indication of a break in continuity of alarm loop 5, there is provided in series a normally open switch R1 and a light L1 which is powered by supply 12 through a normally closed switch R2. Each of lights L1, L2 and L3 are typically provided with red lenses to emphasis that a malfunction exists in a particular part of the system. A further and quick check of the operational status of the entire system is provided by a light L6, conventionally provided with a green lens, in series with normally closed switches R1, R2, R3, R4, R5, across the output of supply 12. A failure as indicated by a change in state or de-energization of any relay associated with these switches will extinguish L6 suggesting a check of the remaining lights to isolate the malfunction.

For purposes of monitoring the operational status of the fire alarm system during an external power failure or a failure of supply 12, there is provided a battery powered trouble indicating circuit 40. Circuit 40 is powered by a rechargeable battery 41. Battery 41 is normally charged by supply 12 through a rectification circuit comprising a 2.5 K ohm resistor 42, a diode 43 and a zener diode 44 coupled to supply 12. Zener diode 44, typically a IN5350R diode, serves to regulate the voltage applied to battery 41.

In parallel with battery 41, there is provided a normally open switch R5 in series with a light L4. Upon a failure of the external ac power, relay R5 would de-energize closing normally open switch R5 and illuminating light L4 using battery 41 as a source of power. Coupled to normally open switch R5 there is provided an audible alarm, such as a bell. Connected to the bell is a first group of normally closed switches S1, R1, R2, R3, R4, R5 in series with a manually operable normally closed switch S2 commonly called a trouble Bell silence switch. Also coupled to the bell, there is provided a second group of normally open switches S1, R1, R2, R3, R4, R5 in series with a manually operable normally closed switch S2. Both groups of switches are powered by battery 41 through the Bell. As is apparent, if a malfunction results in the de-energization of any one of normally energized relays R1–R5, one or more of the normally open switches in the second group will close causing the bell to ring through normally closed switch S2. Furthermore, if normally closed alarm reset switch S1 used in silencing the audio signal broadcast over speakers 24 is left open after all other troubles or malfunctions are corrected, the bell will also be caused to ring through normally closed switch S2.

Manually operable normally closed trouble bell silence switch S2 may be used to silence the bell during the correction of a problem. It will be seen, however, that if normally closed switch S2 is inadvertently left open after the problem is corrected, an electrical path is provided through the above described first group of normally closed switches S1, and R1–R5 through normally open switch S2 to again causing ringing of the Bell.

As a convenience to operators at remote locations from the main operating panel, there is provided in parallel with the main trouble bell described, a remote trouble bell 42 in series with a manually operable remote trouble bell silence switch S3 and a remote trouble light connected between remote trouble bell 42 and the above described second group of normally open switches S1 and R1–R5.

In areas where background sounds are similar to the sound generated by tone generator 30 or when there is a desire to identify the specific station indicator 10 reporting the alarm condition, station indicator 10 may be coded. As is well known, coded station indicators may comprise spring driven mechanisms which make and break electrical paths in a predetermined fashion. For compatibility with such indicators there is provided in series with tone generator 30 and normally open switch R6 a normally closed switch R7 which is controlled by a relay R7 (not shown). Relay R7 if used, should be driven by the coded indicators in a well known manner.

It is understood that while conventional relays and relay controlled switches have been illustrated, it is perfectly acceptable to use digital solid state components in place of the conventional circuit elements described. In every respect, the fire alarm system of the present invention is comprised of conventional components wired in or otherwise coupled to each other in a manner well known to those skilled in the art. The fire alarm system of the present invention is, however, uniquely designed to provide both the functions of a conventional clock, paging and music system and a fully supervised fire alarm system in a single integrated system particularly suitable for use in schools, hospitals and other environments wherein both such functions are normally required.

What is claimed is:

1. A fire alarm system comprising: an audio circuit including a speaker; a source of supervisory signals normally coupled to said audio circuit for detecting malfunctions in said audio circuit; a source of audio alarm signals; an alarm indicating circuit for indicating an alarm condition; switch means coupled to said source of supervisory signals and said source of audio alarm signals and responsive to said alarm indicating circuit for selectively decoupling said source of supervisory signals from said audio circuit and coupling said source of audio alarm signals to said audio circuit for broadcasting an audible alarm through said speakers in response to an indication from said alarm indicating circuit of the existence of an alarm condition.

2. A fire alarm system according to claim 1 wherein said source of supervisory signals is an oscillator for generating a supersonic signal and further comprising: relay means coupled to said audio circuit and said oscillator including means responsive to said supersonic signals for maintaining said relay means, normally energized and means coupled to said relay means for indicating when said relay means is in a de-energized state for indicating a malfunction in either said audio circuit or said oscillator.

3. A fire alarm system according to claim 2 wherein said oscillator is adapted to output a supersonic signal of approximately 26KC.

4. A fire alarm system according to claim 3 wherein said supersonic signal is approximately 26KC and the output power of said oscillator is relatively low.

5. A fire alarm system according to claim 1 wherein said source of audio alarm signals is a tone generator for generating an audible alarm signal and further comprising: relay means coupled to said tone generator including means responsive to the output of said tone generator for maintaining said relay means normally energized and means coupled to said last named relay means for indicating when said last named relay means is in a de-energized state for indicating a malfunction in said tone generator.

6. A fire alarm system according to claim 1 wherein said alarm indicating circuit includes switch means adapted to be switched from a first mode of operation to a second mode of operation to indicate an alarm condition; and further comprising: relay means responsive to said switch means operable to be changed from a normally de-energized state to an energized state when said switch means is switched to its second mode of operation and wherein said relay means serves to control said switch means coupled to said source of supervisory signals and said source of audio alarm signals.

7. A fire alarm system according to claim 6 further comprising: a source of power; a normally energized relay means coupled in series with said source of power and said alarm indicating circuit for monitoring the continuity of said alarm indicating circuit and means coupled to said relay means for indicating when said relay means is de-energized for indicating a break in continuity in said alarm indicating circuit.

8. A fire alarm system comprising a source of dc power; an oscillator for generating a supersonic supervisory signal coupled to said source; a tone generator for generating an audible alarm signal coupled to said source; an audio circuit including a speaker; an alarm relay means, an alarm condition indicating circuit coupled to said source and operable to control said alarm relay means for indicating the existence of an alarm condition, switch means, coupled to said oscillator and said tone generator and responsive to said alarm relay means for selectively de-coupling said oscillator from said audio circuit and coupling said tone generator to said audio circuit for transmitting an audible alarm through said speaker; a first relay coupled to said source of dc power for indicating when said source is producing less than a predetermined amount of power; a second relay coupled to said oscillator and said audio circuit for indicating when said oscillator is failing to generate said supervisory signal and said audio circuit lacks continuity; a third relay coupled to said tone generator and said oscillator for indicating when said tone generator fails to generate said alarm signal and said oscillator is improperly installed in said fire alarm system; a fourth relay coupled to said alarm condition indicating circuit for indicating when said alarm condition indicating circuit lacks continuity; alarm reset switch means having an alarm and a silence mode coupled to said alarm relay means for selectively silencing said audible alarm during the existence of an alarm condition; and means coupled to said alarm reset switch means for providing a trouble signal when said alarm reset switch means is placed in a silence mode in the absence of an alarm condition.

9. A fire alarm system comprising: a source of power, a supersonic signal generator coupled to said source; a tone generator coupled to said source; first switch means coupled to the outputs of said supersonic signal generator and said tone generator; an audio circuit including a speaker coupled to said first switch means, said first switch means serving to selectively coupled said supersonic signal generator and said tone generator to said audio circuit; first relay means coupled to said first switch means; and second switch means coupled to said relay means and operable for changing said first relay means from a de-energized state to an energized state for switching said first switch means.

10. A fire alarm system according to claim 9 further comprising: a second relay means coupled to said supersonic signal generator and said audio circuit for detecting malfunctions in said supersonic signal generator and said audio circuit and means coupled to said second relay means for indicating a detected malfunction.

11. A fire alarm system according to claim 10 further comprising: third relay means coupled to said tone generator for detecting malfunctions in said tone generator, and means coupled to said third relay means for indicating a detected malfunction.

12. A fire alarm system according to claim 11 further comprising: a fourth relay means coupled in series with said second switch means and said first relay means for detecting malfunctions in said second switch means and said first relay means; and means coupled to said fourth relay means for indicating a detected malfunction.

13. A fire alarm system according to claim 12 further comprising: third switch means coupled in series with said first relay means and said second switch for disconnecting said first relay means from said second switch means; and means coupled to said third switch means for indicating when said first relay means is disconnected from said second switch means in the absence of any alarm condition or malfunction in said fire alarm system.

*14. An audio alarm system comprising: an audio circuit, said audio circuit including an amplifying means having an input means and an output means; a speaker circuit coupled to said output means of said amplifying means in said audio circuit; means for coupling said audio and said speaker circuits to a first source of audio frequency signals; means forming an oscillator for generating supervisory signals having an inaudible frequency; means for coupling said generating means to said input means of said audio circuit and said speaker circuit, said coupling means including means for superimposing said supervisory signals and said audio frequency signals from said first source in said amplifying means of said audio circuit and said speaker circuit; means responsive to said supervisory signals coupled to said output means of said amplifying means for detecting malfunctions in said amplifying means and said speaker circuit; a second source of audio frequency signals for generating audio frequency alarm signals; an alarm-indicating circuit for indicating the existence of an alarm condition; and means responsive to an indication of the existence of an alarm condition from said alarm-indicating circuit for coupling said source of audio frequency alarm signals to said audio circuit for broadcasting said audio frequency alarm signals over said speaker circuit.*

*15. An audio alarm system according to claim 14 further comprising: a means coupled to said alarm indicating circuit for detecting malfunctions in said alarm indicating circuit.*

* * * * *